(12) United States Patent
Wu

(10) Patent No.: US 10,110,777 B1
(45) Date of Patent: Oct. 23, 2018

(54) IMAGE SCANNING APPARATUS

(71) Applicant: Microtek International Inc., Hsinchu (TW)

(72) Inventor: Chin-Lai Wu, Hsinchu (TW)

(73) Assignee: MICROTEK INTERNATIONAL INC., Hsinchu (TW)

( * ) Notice: Subject to any disclaimer, the term of this patent is extended or adjusted under 35 U.S.C. 154(b) by 0 days.

(21) Appl. No.: 15/487,043

(22) Filed: Apr. 13, 2017

(51) Int. Cl.
*H04N 1/04* (2006.01)
*H04N 1/40* (2006.01)
*H04N 1/00* (2006.01)
*H04N 1/193* (2006.01)

(52) U.S. Cl.
CPC ..... *H04N 1/40056* (2013.01); *H04N 1/00018* (2013.01); *H04N 1/193* (2013.01)

(58) Field of Classification Search
None
See application file for complete search history.

(56) References Cited

U.S. PATENT DOCUMENTS

| | | | | | |
|---|---|---|---|---|---|
| 6,157,468 A | * | 12/2000 | Tsai | ........... | H04N 1/00002 358/488 |
| 6,201,619 B1 | * | 3/2001 | Neale | ........... | G02B 7/08 358/474 |
| 6,587,227 B1 | * | 7/2003 | Fullerton | ........... | H04N 1/00811 355/25 |
| 6,603,580 B1 | * | 8/2003 | Taillie | ........... | H04N 1/047 358/474 |
| 6,608,705 B1 | * | 8/2003 | Oshima | ........... | H04N 1/00013 358/474 |
| 7,345,796 B2 | * | 3/2008 | Sasama | ........... | H04N 1/02409 358/444 |
| 7,706,632 B2 | * | 4/2010 | Gouch | ........... | G06K 9/209 345/629 |
| 8,237,996 B2 | * | 8/2012 | Takeuchi | ........... | H04N 1/02865 358/474 |
| 2004/0047004 A1 | * | 3/2004 | Liu | ........... | H04N 1/02409 358/474 |
| 2008/0067381 A1 | * | 3/2008 | Hiroi | ........... | G01R 31/307 250/310 |
| 2008/0180765 A1 | * | 7/2008 | Nakashita | ........... | H04N 1/00933 358/498 |
| 2010/0171997 A1 | * | 7/2010 | Lee | ........... | H04N 1/024 358/474 |
| 2012/0243061 A1 | * | 9/2012 | Imai | ........... | H04N 1/00726 358/494 |
| 2014/0152794 A1 | * | 6/2014 | Takahashi | ........... | G01B 11/24 348/79 |
| 2015/0185465 A1 | * | 7/2015 | Karube | ........... | G02B 21/025 348/79 |
| 2016/0211112 A1 | * | 7/2016 | Nakao | ........... | H01J 37/226 |
| 2017/0038314 A1 | * | 2/2017 | Suyama | ........... | G01N 23/04 |

FOREIGN PATENT DOCUMENTS

JP    04288774 A  * 10/1992
JP    2005229407 A  * 8/2005

\* cited by examiner

*Primary Examiner* — Cheukfan Lee
(74) *Attorney, Agent, or Firm* — Muncy, Geissler, Olds & Lowe, P.C.

(57) ABSTRACT

An image scanning apparatus captures multiple images of an object corresponding to different heights at each scanning position, analyzes the resolutions of the multiple images to choose one best partial image, and combines the partial images at different scanning positions to produce a scanned image of the object, so as to improve the resolution of the scanned image.

12 Claims, 2 Drawing Sheets

IMAGE SCANNING APPARATUS

BACKGROUND OF THE INVENTION

1. Field of the Invention

The present invention relates to an image scanning apparatus, and more particularly to an image scanning apparatus that can improve the resolution of the scanned image.

2. Description of the Prior Art

In order to improve the scanning resolution, a traditional image scanning apparatus usually adopts two more scanning processes. First, a first scan is conducted with a lower resolution to obtain a focus map of the overall image. Then, a second scan is conducted with the resolution adjusted to the actually needed resolution and with the focal length in the height direction adjusted according to the foregoing focus map. Therefore, the traditional image scanning apparatus needs to conduct two focusing and scanning processes to obtain a scanned image of high resolution, which leads to the complex operation and the long scanning time.

Thus, the most important goal for now is to provide an image scanning apparatus that can improve the resolution of the scanned image.

SUMMARY OF THE INVENTION

The present invention is directed to provide an image scanning apparatus, which uses an image processing unit and an image capturing unit to capture multiple images of an object corresponding to different heights at each scanning position, analyze the resolutions of the multiple images to choose one best partial image, and combine the partial images at different scanning positions to produce a scanned image of the object, so as to improve the resolution of the scanned image.

An image scanning apparatus of one embodiment of the present invention includes a scanning light source, an image capturing unit, a first driving unit, a second driving unit and an image processing unit. The scanning light source provides a light to irradiate an object. The first driving unit drives the image capturing unit and the object to move with respect to each other among multiple scanning positions, so as to scan the object. The second driving unit is connected to the image capturing unit, and the second driving unit drives the image capturing unit to move along a height direction, wherein the height direction is perpendicular to a surface of the object. The image processing unit is electrically connected to the image capturing unit, the first driving unit and the second driving unit, wherein the image capturing unit captures multiple images of the object corresponding to different heights when moving along the height direction at each scanning position and delivers the multiple images to the image processing unit, and the image processing unit outputs one of the multiple images as one partial image at the scanning position and combines the partial image at each different scanning position to produce a scanned image of the object.

The objective, technologies, features and advantages of the present invention will become apparent from the following description in conjunction with the accompanying drawings wherein certain embodiments of the present invention are set forth by way of illustration and example.

DESCRIPTION OF THE PREFERRED EMBODIMENT

Various embodiments of the present invention will be described in detail below and illustrated in conjunction with the accompanying drawings. In addition to these detailed descriptions, the present invention can be widely implemented in other embodiments, and apparent alternations, modifications and equivalent changes of any mentioned embodiments are all included within the scope of the present invention and based on the scope of the Claims. In the descriptions of the specification, in order to make readers have a more complete understanding about the present invention, many specific details are provided; however, the present invention may be implemented without parts of or all the specific details. In addition, the well-known steps or elements are not described in detail, in order to avoid unnecessary limitations to the present invention. Same or similar elements in Figures will be indicated by same or similar reference numbers. It is noted that the Figures are schematic and may not represent the actual size or number of the elements. For clearness of the Figures, some details may not be fully depicted.

Figure 1:
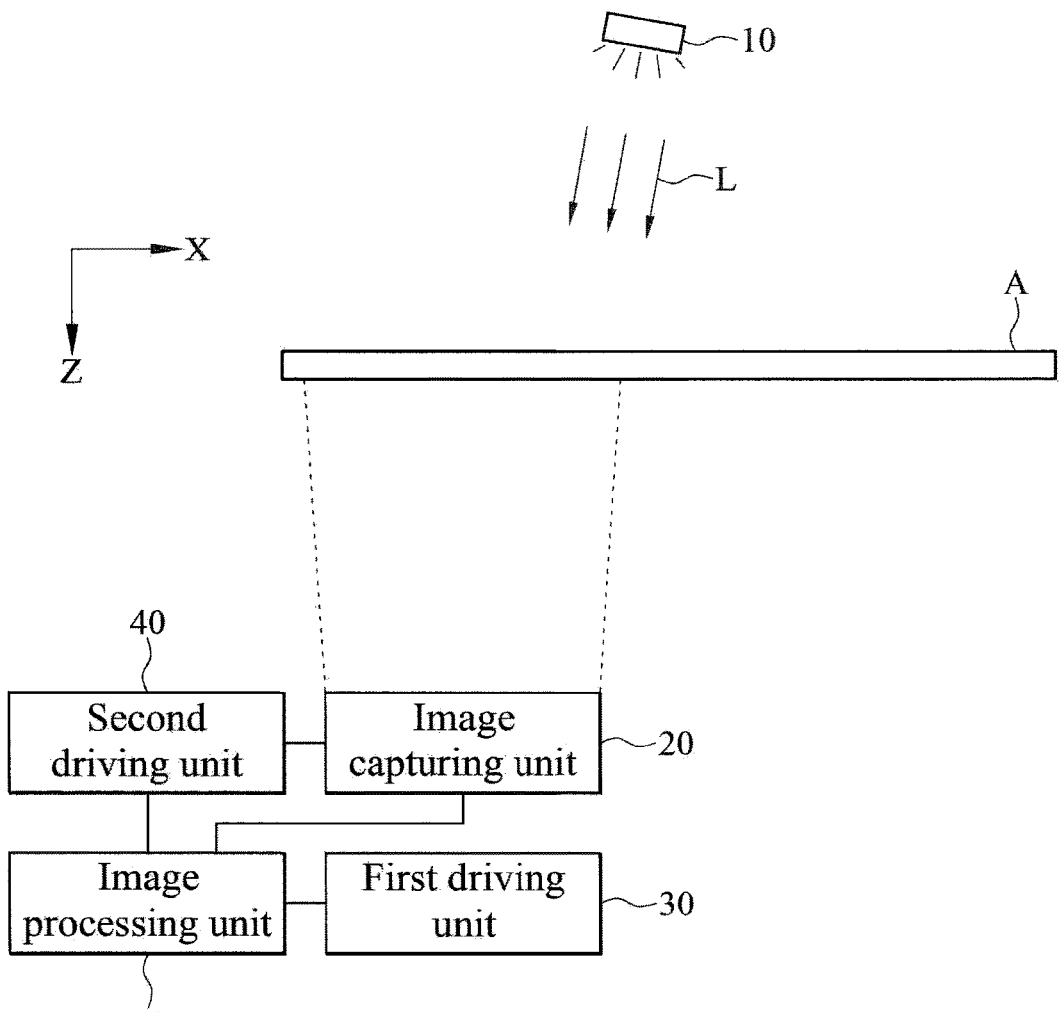
FIG. 1 is a schematic view, showing an image scanning apparatus of one embodiment of the present invention.

Referring to FIG. 1 together, an image scanning apparatus of one embodiment of the present invention includes a scanning light source 10, an image capturing unit 20, a first driving unit 30, a second driving unit 40 and an image processing unit 50. The scanning light source 10 provides a light L to irradiate an object A. The first driving unit 30 drives the image capturing unit 20 and the object A to move with respect to each other among multiple scanning positions along a scanning direction X, so as to scan the object A. In one embodiment, if the object A is a transparent material and the scanning light source 10 and the image capturing unit 20 are disposed at opposite sides of the object A respectively, then the image capturing unit 20 receives the light L transmitting through the object A, so as to realize a transmission image scanning apparatus, which is not a limitation. In another embodiment, the scanning light source (not shown) and the image capturing unit 20 are disposed at the same side of the object A respectively, and the image capturing unit 20 receives the light L reflected by the object A, so as to realize a reflecting image scanning apparatus. The second driving unit 40 is connected to the image capturing unit 20, and the second driving unit 40 drives the image capturing unit 20 to move along a height direction Z, wherein the height direction Z is perpendicular to a surface of the object A, i.e., perpendicular to the scanning direction X. In one embodiment, the image capturing unit 20 includes a Line-Scan light-sensing device. In one embodiment, the image capturing unit 20 includes a charge coupled device (CCD) that may be coordinated with a single lens or a lens set, which may not be a limitation. In another embodiment, the image capturing unit 20 includes a contact image sensor (CIS), which only needs multiple small rod lens for imaging and is closer to the object A, so that a light path of the light L is shortened significantly and the contrast of the scanned image is improved directly.

In one embodiment, the first driving unit 30 or the second driving unit 40 includes a pulse driving unit. For example, the first driving unit 30 or the second driving unit 40 is a stepper motor. It may be understood that the pulse driving unit is a driving device that rotates in a particular angle gradually through the pulse control and usually adopts the open loop control mode for processing. Therefore, the pulse driving unit may achieve the accurate control of the position and speed without a feedback device for the position detection and speed detection and have an excellent stability. Therefore, the pulse driving unit may save the vast and complex hardware assembly space to achieve the design effect of lightweight, and reduce the production cost.

Continued with the foregoing descriptions, the image processing unit 50 is electrically connected to the image capturing unit 20, the first driving unit 30 and the second driving unit 40. The image capturing unit 50 captures multiple images of the object corresponding to different heights at each scanning position and delivers the multiple images to the image processing unit 50.

In addition, the image processing unit 50 receives the multiple images, outputs the clearest one of the multiple images as one partial image at the scanning position and combines the partial image at each different scanning position to produce a scanned image of the object A.

Figure 2:
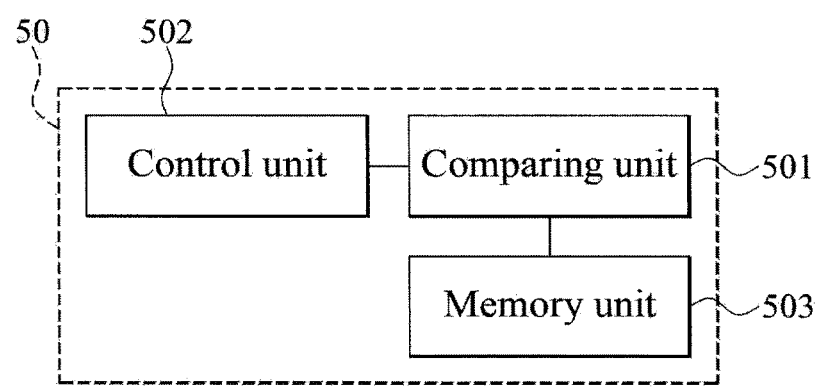
FIG. 2 is a schematic view, showing an image processing unit of one embodiment of the present invention.

Referring to FIG. 1 and FIG. 2 together, in one embodiment, the image processing unit 50 further includes a memory unit 503 which stores the partial images of the object A, such as a partial image of a strip area, so that the image processing unit 50 may combine the different partial images at different scanning positions. In another embodiment, the image processing unit 50 further includes a comparing unit 501 which calculates multiple Modulation transfer function values corresponding to the multiple images and outputs the partial image, wherein the Modulation transfer function value of the partial image is the maximum Modulation transfer function value, i.e., having the best resolution. In one embodiment, the image processing unit 50 further includes a control unit 502 which produces a first control signal to the first driving unit 30 according to the partial image. The first driving unit 30 drives the image capturing unit 20 and the object A to move with respect to each other to an adjacent scanning position according to the first control signal. For example, after the image processing unit has obtained a partial image at a scanning position, it means that the partial image that has the best focusing quality at the scanning position has been obtained. Therefore, the first driving unit may be commanded to drive the image capturing unit to move to another scanning position to capture multiple images of the object corresponding to different heights, and the above-mentioned steps of the modulation transfer function (MTF) analysis and the image selection may be repeated, so as to obtain another partial image that has the best focusing quality at the another scanning position.

In another embodiment, the image processing unit 50 may also produce a second control signal to the second driving unit 40 through the control unit 502 to drive the image capturing unit 20 to move along a height direction Z at the same scanning position, and at the same time, the image processing unit 50 controls the image capturing unit 20 to capture multiple images of the object corresponding to different heights.

It is needed to be explained that an image capturing number for capturing multiple images at the same one scanning position is mainly determined by a value of the depth of field D of the image capturing unit 20 and a maximum height value H of the object. In one embodiment, if the maximum height value of the surface of the object A is H and the value of the depth of field of the image capturing unit 20 is D, then the image capturing number of the image capturing unit 20 for capturing multiple images at the same one scanning position is more than or equal to a quotient of the maximum height value H of the object A divided by the value of the depth of field D of the image capturing unit 20. For example, as to the object A that has an uneven surface, if the surface thereof has a maximum height value of 5 mm and the value of the depth of field of the image capturing unit 20 is 2 mm, then the image capturing number of the image capturing unit 20 for capturing multiple images at the same one scanning position is more than or equal to the integer value of [5/2], i.e., 3 at least. In other words, the second driving unit 40 needs to drive the image capturing unit 20 to move along the height direction Z at least 3 times, and the image processing unit 50 controls the image capturing unit 20 to capture image 3 times at different Z axis heights. In another embodiment, the image processing unit 50 may preset an image capturing number of 10, and obtain 10 images at different Z axis heights to conduct subsequent image analysis, such as the above-mentioned MTF analysis and the image selection. It may be understood that the focusing quality of the scanned image may be adjusted through the image capturing number in the Z axis height direction. For example, capturing 20 images at the same one scanning position, compared with capturing 10 images, should have a better focusing quality and may obtain a better partial image. Those skilled in the art may modify and change, and may not be limited to this.

Figure 3:
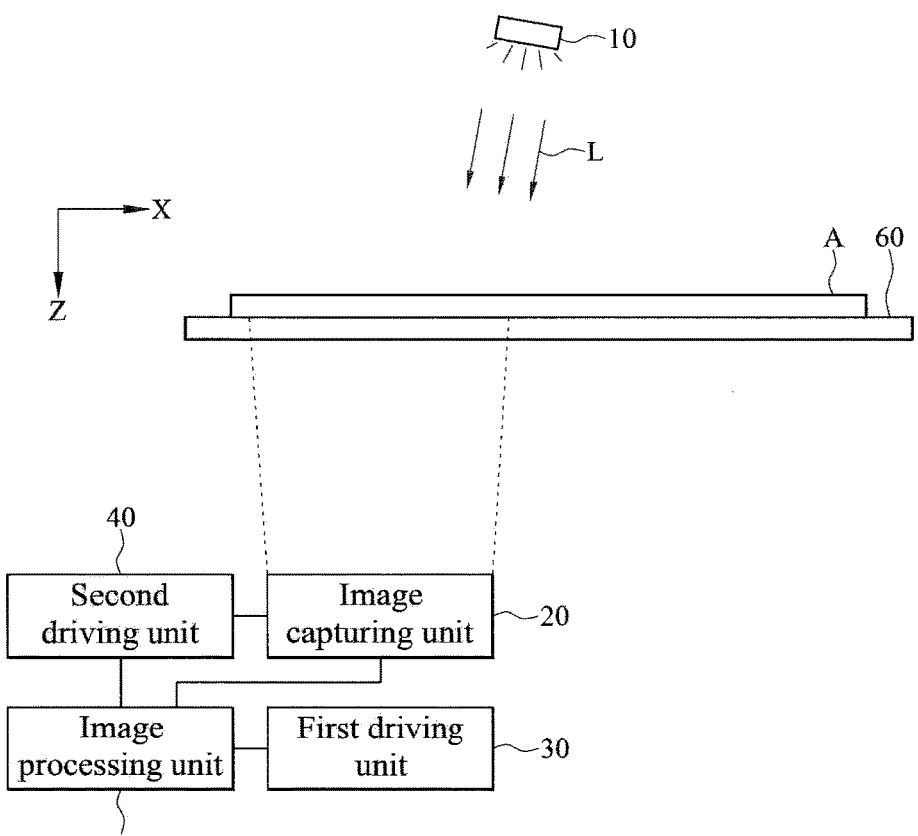
FIG. 3 is a schematic view, showing an image scanning apparatus of another embodiment of the present invention.
Figure 4:
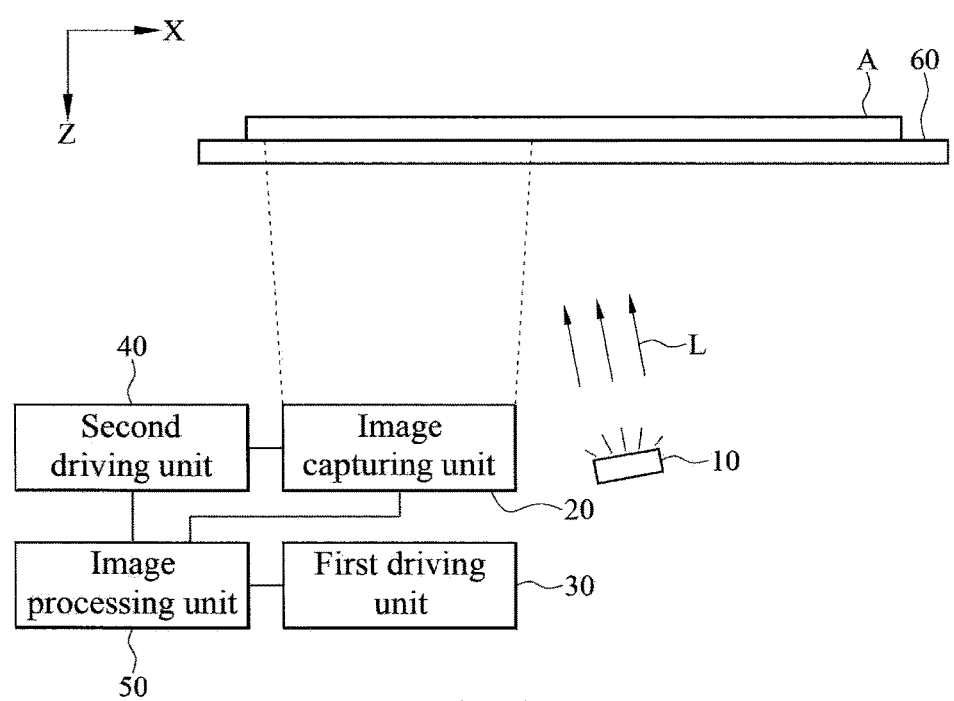
FIG. 4 is a schematic view, showing an image scanning apparatus of yet another embodiment of the present invention.

Referring to FIG. 3, in one embodiment, the image scanning apparatus further includes a platform 60 having a transparent material. The object A may be a transparent material as well, and the scanning light source 10 and the image capturing unit 20 are disposed at opposite sides of the platform 60 respectively, so as to realize a transmission image scanning apparatus. Referring to FIG. 4, in another embodiment, the scanning light source 10 and the image capturing unit 20 are disposed at the same side of the platform 60 respectively, so as to realize a reflecting image scanning apparatus. In another embodiment, the first driving unit 30 is connected to the platform 60, and the first driving unit 30 drives the platform 50 to move along the scanning direction X, so as to scan the object A. In another embodiment, the first driving unit 30 is connected to the image capturing unit 20 to drive the image capturing unit 20 to scan the object A. In yet another embodiment, the scanning light source 10 that is connected to the first driving unit 30 through a connecting rod component may scan the object A synchronously with the image capturing unit 20. Those skilled in the art may modify and change, and may not be limited to this.

To sum up the foregoing descriptions, the image scanning system of the present invention uses an image processing unit and an image capturing unit to capture multiple images of an object corresponding to different heights at each scanning position, analyze the resolutions of the multiple images to choose one best partial image, and combine the partial images at different scanning positions to produce a scanned image of the object, so as to improve the resolution of the scanned image. Thus, the image scanning system of the present invention may obtain a scanned image of high resolution through a one-time scanning process. In addition, compared with the traditional image scanning apparatus, the image scanning apparatus of the present invention may save the vast and complex hardware assembly space to achieve the design effect of lightweight, and reduce the production cost.

The above embodiments are only for describing the subject matters and characteristics of the present invention, which purpose is to make those skilled in the art understand the content of the present invention and implement accordingly, and can not be used to limit the scope of the present invention. Any equivalent change or modification in accordance with the spirit disclosed in the present invention should fall within the scope of the present invention.

What is claimed is:

1. An image scanning apparatus comprising:
    a scanning light source to provide a light to irradiate an object;
    an image capturing unit disposed opposite to the object;
    a first driving unit to drive the image capturing unit and the object to move with respect to each other among multiple scanning positions, so as to scan the object;
    a second driving unit connected to the image capturing unit to drive the image capturing unit to move along a height direction, wherein the height direction is perpendicular to a surface of the object; and
    an image processing unit electrically connected to the image capturing unit, the first driving unit and the second driving unit, wherein the image capturing unit captures multiple images of the object corresponding to different heights when moving along the height direction at each the scanning position and delivers the multiple images to the image processing unit, and the image processing unit outputs one of the multiple images as one partial image at the scanning position and combines the partial image at each different scanning position to produce a scanned image of the object.

2. The image scanning apparatus according to claim 1, wherein the image processing unit further comprises a comparing unit to calculate multiple Modulation transfer function values of the multiple images and output the partial image, wherein the Modulation transfer function value of the partial image is the maximum Modulation transfer function value.

3. The image scanning apparatus according to claim 1, wherein the image processing unit further comprises a control unit to produce a control signal to the first driving unit according to the partial image, and the first driving unit drives the image capturing unit and the object to move with respect to each other to adjacent the scanning position according to the control signal.

4. The image scanning apparatus according to claim 1, wherein the image processing unit further comprises a memory unit to store the partial image.

5. The image scanning apparatus according to claim 1, wherein the second driving unit comprises a stepper motor.

6. The image scanning apparatus according to claim 1, wherein an image capturing number of the image capturing unit for capturing multiple images at the same one scanning position is more than or equal to a quotient of a maximum height value of the object divided by a value of the depth of field of the image capturing unit.

7. The image scanning apparatus according to claim 1, wherein the first driving unit comprises a stepper motor connected to the image capturing unit.

8. The image scanning apparatus according to claim 1, wherein the image capturing unit comprises a charge coupled device or a contact image sensor.

9. The image scanning apparatus according to claim 1, wherein the image capturing unit comprises a Line-Scan light-sensing device.

10. The image scanning apparatus according to claim 1, wherein the scanning light source and the image capturing unit are disposed a t opposite sides of the object.

11. The image scanning apparatus according to claim 1, wherein the scanning light source and the image capturing unit are disposed a t the same side of the object.

12. The image scanning apparatus according to claim 1, further comprising a platform having a transparent material.

* * * * *